United States Patent
Doh (10) Patent No.: US 9,758,142 B2
(45) Date of Patent: Sep. 12, 2017

(54) HYDRAULIC BRAKE SYSTEM

(71) Applicant: MANDO CORPORATION, Gyeonggi-do (KR)

(72) Inventor: Yoon-Ho Doh, Yongin-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 0 days.

(21) Appl. No.: 14/736,185

(22) Filed: Jun. 10, 2015

(65) Prior Publication Data

US 2015/0360662 A1    Dec. 17, 2015

(30) Foreign Application Priority Data

Jun. 13, 2014    (KR) ........................ 10-2014-0071883

(51) Int. Cl.
*B60T 13/14* (2006.01)
*B60T 8/40* (2006.01)
*B60T 8/48* (2006.01)

(52) U.S. Cl.
CPC .......... *B60T 13/148* (2013.01); *B60T 8/4068* (2013.01); *B60T 13/14* (2013.01); *B60T 8/4872* (2013.01)

(58) Field of Classification Search
CPC ...... B60T 13/14; B60T 13/148; B60T 8/4068; B60T 17/06; F15B 1/04; Y10S 303/11
USPC .......................................................... 303/87
See application file for complete search history.

(56) References Cited

U.S. PATENT DOCUMENTS

| | | | | |
|---|---|---|---|---|
| 3,837,354 A | * | 9/1974 | Farr | B60T 13/148 137/118.06 |
| 4,448,458 A | * | 5/1984 | Knothe | B60T 11/323 188/151 A |
| 4,877,055 A | * | 10/1989 | Knuchel | B60T 13/148 137/565.34 |
| 5,655,569 A | * | 8/1997 | Tackett | B60T 8/4068 138/30 |
| 6,017,099 A | * | 1/2000 | Schneider | B60T 8/368 138/30 |
| 6,375,279 B1 | * | 4/2002 | Cassidy | B60T 7/042 303/116.1 |

(Continued)

FOREIGN PATENT DOCUMENTS

DE    102010002016 A1    8/2011
JP    2009-133480 A    6/2009

(Continued)

OTHER PUBLICATIONS

Office Action issued in related Chinese Patent Application No., 201510324057.1, dated May 31, 2017.

*Primary Examiner* — Vishal Sahni
(74) *Attorney, Agent, or Firm* — McDermott Will & Emery LLP (57) ABSTRACT

Disclosed is a hydraulic brake system provided with a high pressure accumulator that reduces a pressure pulsation of brake oil being discharged through operation of a pump. The high pressure accumulator includes a damping member that is provided in a bore communicating with an inlet port and an outlet port of the high pressure accumulator respectively allowing brake oil to be introduced and discharged therethrough, and is provided with a bypass flow passage connecting the inlet port to the outlet port, and a reinforcing member installed at the damping member to improve durability of the damping member.

11 Claims, 5 Drawing Sheets

(56) References Cited

U.S. PATENT DOCUMENTS

| | | | |
|---|---|---|---|
| 9,096,200 B2 * | 8/2015 | Zeoli | B60T 7/22 |
| 2004/0155522 A1 * | 8/2004 | Martella | B60T 8/368 |
| | | | 303/113.1 |
| 2011/0079140 A1 * | 4/2011 | Baseley | F15B 1/26 |
| | | | 92/90 |
| 2012/0025598 A1 * | 2/2012 | Park | B60T 8/4068 |
| | | | 303/2 |
| 2012/0025599 A1 * | 2/2012 | Park | B60T 7/042 |
| | | | 303/6.01 |
| 2012/0049616 A1 * | 3/2012 | Park | B60T 17/04 |
| | | | 303/9.62 |

FOREIGN PATENT DOCUMENTS

| | | |
|---|---|---|
| JP | 2009-234401 A | 10/2009 |
| KR | 2003-0006155 A | 1/2003 |
| KR | 10-2011-0021357 A | 3/2011 |
| KR | 10-2012-0018417 A | 3/2012 |
| WO | 2005/030543 A1 | 4/2005 |

\* cited by examiner

HYDRAULIC BRAKE SYSTEM

CROSS-REFERENCE TO RELATED APPLICATION

This application claims the benefit of Korean Patent Application No. 2014-0071883, filed on Jun. 13, 2014 in the Korean Intellectual Property Office, the disclosure of which is incorporated herein by reference.

BACKGROUND

1. Field

Embodiments of the present disclosure relate to a hydraulic brake system, and more particularly, to a hydraulic brake system capable of reducing a pressure pulsation of brake oil discharged from a pump.

2. Description of the Related Art

In general, a hydraulic brake system includes a modulator block provided with a plurality of solenoid valves, a low pressure accumulator that temporarily stores oil and a high pressure accumulator, a pump that pumps oil stored in the low pressure accumulator and a motor that drives the pump, and an electronic control unit (ECU) that controls electrically operated parts, thereby controlling braking pressure transmitted to brakes of a vehicle.

The hydraulic brake system adopts a structure in which a high pressure accumulator is provided with a predetermined damping space to reduce a pressure pulsation that is generated when liquid pressure of brake oil being discharged from the pump has a high pressure, and an orifice is provided at an outlet port drawn through the high pressure accumulator. In order to maximize the effect of reducing the pressure pulsation, an inlet port introduced into the high pressure accumulator needs to be maximally spaced apart from the outlet port of the high pressure accumulator. A hydraulic brake system having such a high pressure accumulator is disclosed in Korean Unexamined Patent Publication No. 10-2003-0006155.

However, a plurality of passages formed in a modulator block to control a braking pressure are configured such that a plurality of solenoid valves, pumps, low pressure accumulators and high pressure accumulators are connected at an inside of the modulator block, which complicates the structure of the passages and causes difficulty in disposing the inlet port and the outlet port connected to the high pressure accumulator to be spaced apart from each other in the passage design and process, and also increases the manufacturing cost of the brake.

If the inlet port is disposed collinear with the outlet port, the manufacturing process is facilitated, but the inlet port and the outlet port are caused to be adjacent to each other, thereby lowering the performance in reducing the pressure pulsation.

PRIORITY ART DOCUMENT

Korean Unexamined Patent Publication No. 10-2003-0006155 (Mando Corporation, Jan. 23, 2003)

SUMMARY

Therefore, it is an aspect of the present disclosure to provide a hydraulic brake system capable of ensuring easy production thereof by disposing the inlet port and the outlet port to be collinear with each other and capable of effectively reducing a pressure pulsation by forming a bypass flow passage in the high pressure accumulator.

Additional aspects of the disclosure will be set forth in part in the description which follows and, in part, will be obvious from the description, or may be learned by practice of the disclosure.

In accordance with one aspect of the present disclosure, a hydraulic brake system provided with a high pressure accumulator that reduces a pressure pulsation of brake oil being discharged through operation of a pump, wherein the high pressure accumulator includes a damping member and a reinforcing member. The damping member may be provided in a bore communicating with an inlet port and an outlet port of the high pressure accumulator, respectively allowing brake oil to be introduced and discharged therethrough, and may be provided with a bypass flow passage connecting the inlet port to the outlet port. The reinforcing member may be installed at the damping member to improve durability of the damping member.

The bypass flow passage may be formed by a groove that is formed in an outer circumferential surface of the damping member to communicate the inlet port with the outlet port.

The groove may be provided in a plurality thereof formed on the outer circumferential surface of the damping member in a lengthwise direction of the damping member while spaced apart from each other.

The damping member may have a lower end spaced apart from a bottom surface of the bore.

The reinforcing member may include an insertion part and a support part. The insertion part may be inserted into a hollow part formed at the center of the damping member. The support part may be bentedly extending from one end of the insertion part and may make contact with one end of the damping member so as to be prevented from being separated from the damping member.

The insertion part may include a convex and a concave that are repeatedly formed in a lengthwise direction of the insertion part, so that a subsidiary damping space is formed between the damping member and the concave.

The hydraulic brake system may further include a cap member coupled to the damping member in a press fitting manner to close the bore.

A coupling groove may be formed in an inner surface of the cap member, and the damping member may have a protrusion part combined with the coupling groove.

The damping member may include rubber so as to be elastically deformable.

The inlet port and the outlet port may be disposed opposite to each other with respect to the bore.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Various embodiments will now be described more fully with reference to the accompanying drawings in which some embodiments are shown. These inventive concepts may, however, be embodied in different forms and should not be construed as limited to the embodiments set forth herein. Rather, these embodiments are provided so that this disclosure is thorough and complete and fully conveys the inventive concept to those skilled in the art. In the drawings, the sizes and relative sizes of layers and regions may be exaggerated for clarity.

Figure 1:
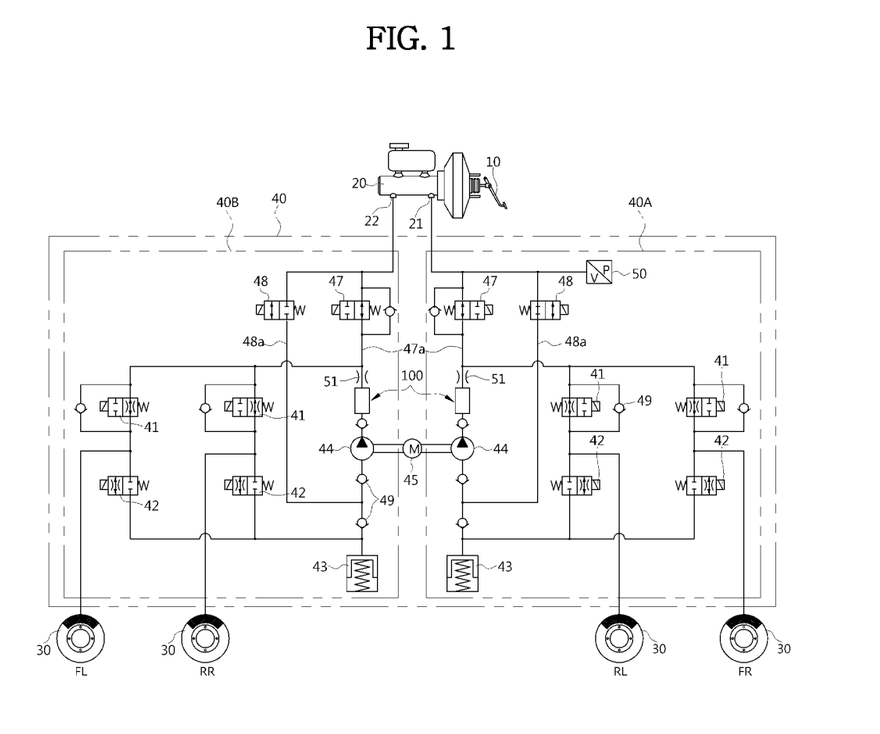
FIG. 1 is a hydraulic circuit diagram of a hydraulic brake system according to an embodiment of the present disclosure.

FIG. 1 is a hydraulic circuit diagram of a hydraulic brake system according to an embodiment of the present disclosure.

Referring to FIG. 1, a hydraulic brake system according to an embodiment of the present disclosure includes a brake pedal 10 that receives an operation force of a driver, a brake booster 11 that amplifies a tread force by using difference between the vacuum pressure and the atmospheric pressure by the tread force, a master cylinder 20 that causes the brake booster 11 to generate a pressure, a first hydraulic circuit 40A that connects a first port 21 of the master cylinder 20 to wheel cylinders 30 provided at two vehicle wheels FR and RL, and a second hydraulic circuit 40B that connects a second port 22 of the master cylinder 20 to wheel cylinders 30 provided at the remaining two vehicle wheels FL and RR. The first hydraulic circuit 40A and the second hydraulic circuit 40B are installed in a modulator 40 in a compact manner.

Each of the first and second hydraulic circuits 40A and 40B includes solenoid valves 41 and 42 that control a braking liquid pressure transmitted to two wheel cylinders 30 side, a pump 44 that sucks and pumps oil discharged from the wheel cylinder 30 side or oil from the master cylinder 20 by the drive of a motor 45, a low pressure accumulator 43 that temporarily stores the oil discharged from the wheel cylinder 30, a main oil passage 47a that connects an outlet of the pump 44 and the master cylinder 20, an auxiliary oil passage 48a that guides oil of the master cylinder 20 to be sucked into an inlet of the pump 44, and an electronic control unit (ECU; not shown) that controls the drive of the plurality of solenoid valves 41 and 42 and the motor 45.

In this instance, as shown in FIG. 1, the solenoid valves 41 and 42, the low pressure accumulator 43, the pump 44, the main oil passage 47a, and the auxiliary oil passage 48a are provided in each of the first and second hydraulic circuits 40A and 40B.

More specifically, the plurality of solenoid valves 41 and 42 are in conjunction with upstream and downstream sides of the wheel cylinder 30, and are divided into a normal open type solenoid valve 41 that is disposed on the upstream side of the wheel cylinder 30 and remains normally opened and a normal closed type solenoid valve 42 that is disposed on the downstream side of the wheel cylinder 30 and remains normally closed. Opening and closing operations of the solenoid valves 41 and 42 may be controlled by the electronic control unit (not shown), and the normal closed type solenoid valve 42 is opened in accordance with pressure reducing braking, so that oil discharged from the wheel cylinder 30 side may be temporarily stored in the low pressure accumulator 43.

The pump 44 may be driven by the motor 45 so as to suck and discharge the oil stored in the low pressure accumulator 43, and therefore a liquid pressure is transmitted to the wheel cylinder 30 side or the master cylinder 20 side.

In addition, in the main oil passage 47a for connecting the master cylinder 20 and the outlet of the pump 44, a normal open type solenoid valve 47 (hereinafter referred to as "TC valve") for traction control system (TCS) is provided. The TC valve 47 remains normally opened, and allows a braking liquid pressure formed in the master cylinder 20 at the time of general braking through the brake pedal 10 to be transmitted to the wheel cylinder 30 side through the main oil passage 47a.

In addition, the auxiliary oil passage 48a is branched from the main oil passage 47a, and guides oil of the master cylinder 20 to be sucked into the inlet side of the pump 44. In the auxiliary oil passage 48a, a shuttle valve 48 for causing the oil to flow only to the inlet of the pump 44 is provided. The shuttle valve 48 that is electrically operated is provided in the middle of the auxiliary oil passage 48a so that the shuttle valve 48 is normally closed but opened in a TCS mode.

Meanwhile, a reference numeral "49" which is not described refers to a check valve that is provided in an appropriate position of the oil passage in order to prevent reverse flow of oil, and a reference numeral "50" refers to a pressure sensor that detects a braking pressure transmitted to the TC valve 47 and the shuttle valve 48. A reference numeral "51" refers to an orifice.

In the above-described brake system, a pressure pulsation is generated from a liquid pressure pumped from the pump 44 in accordance with the operation of the motor 45 when braking. In order to reduce the pressure pulsation, an embodiment of the present disclosure provides the high pressure accumulators 100 each connected to the outlet port of the pump 44 of the respective one of the hydraulic pressure circuits 40A and 40B.

Figure 2:
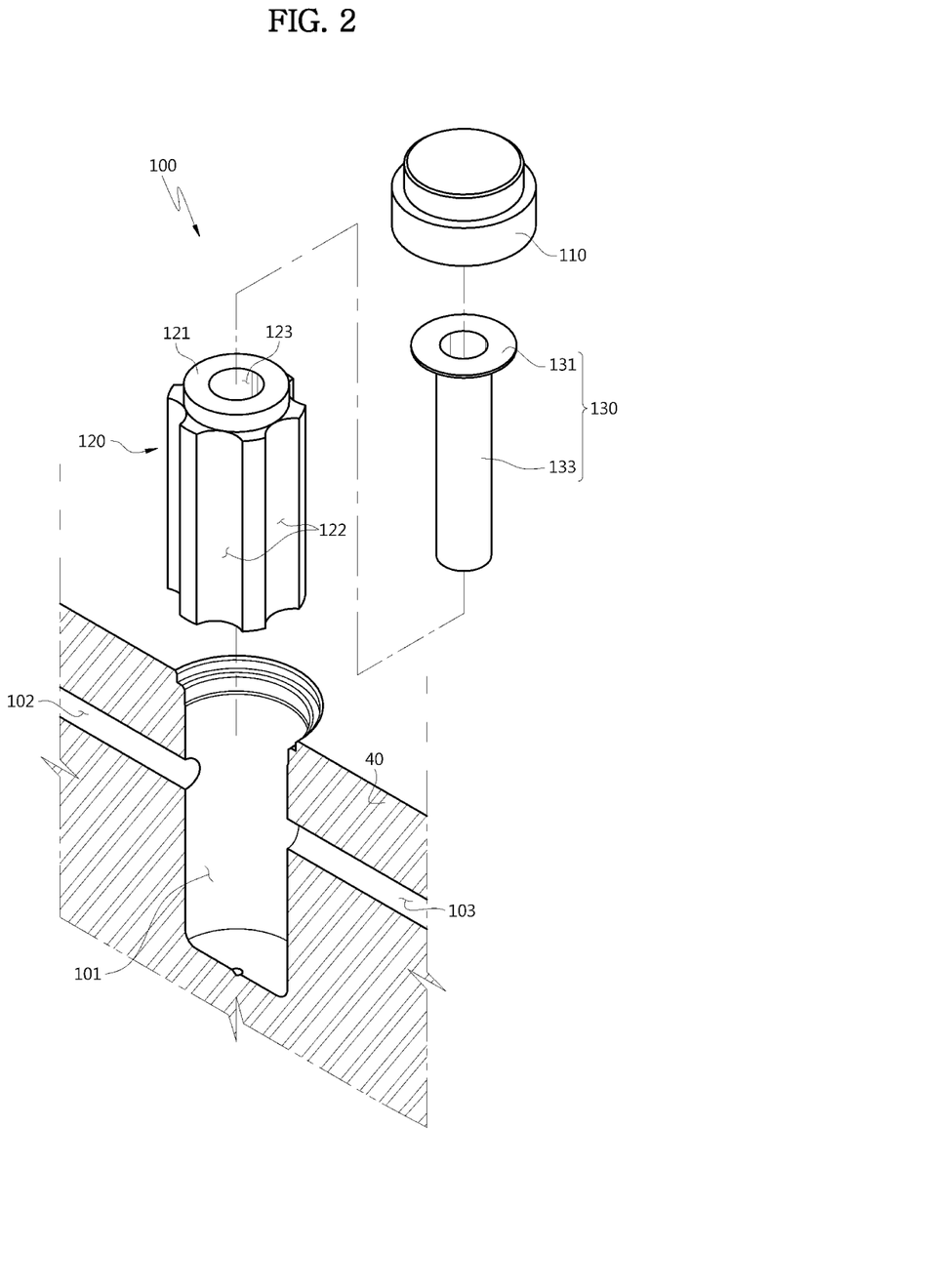
FIG. 2 is an exploded perspective view illustrating a state in which a high pressure accumulator is assembled to a modulator block provided in a hydraulic brake system according to an embodiment of the present disclosure.
Figure 3:
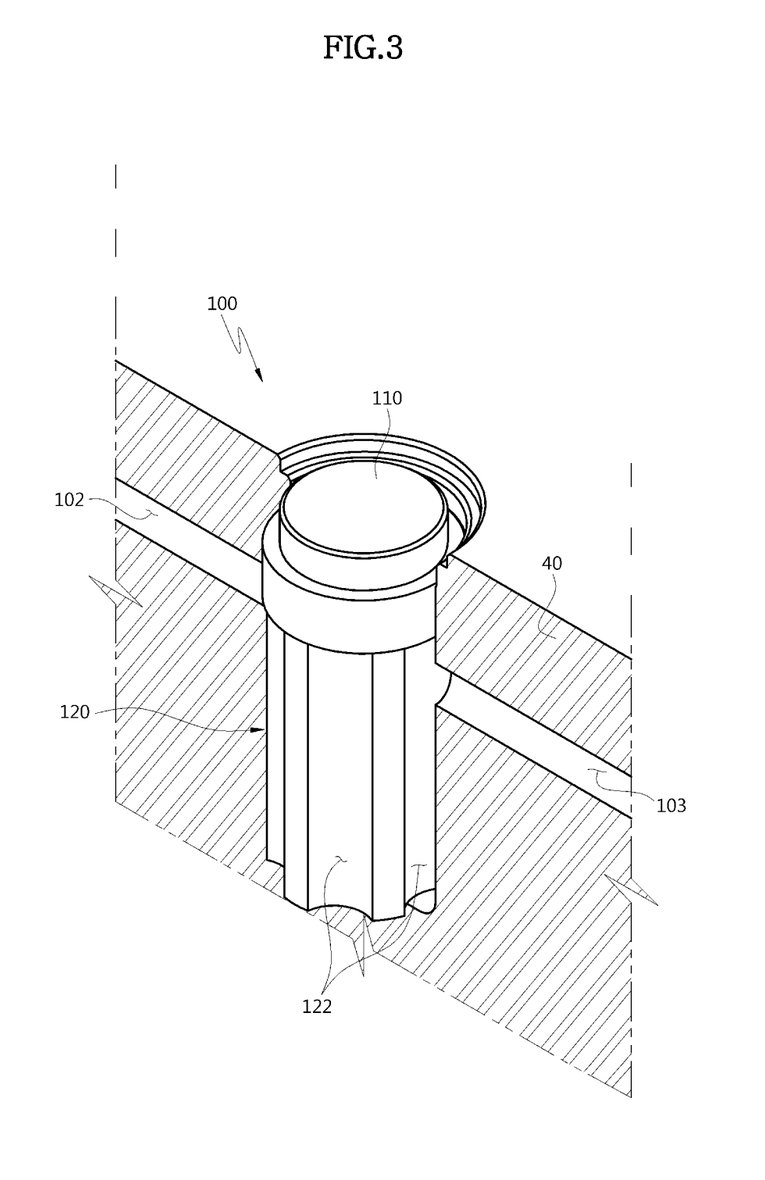
FIG. 3 is an assembled perspective view of FIG. 2.
Figure 4:
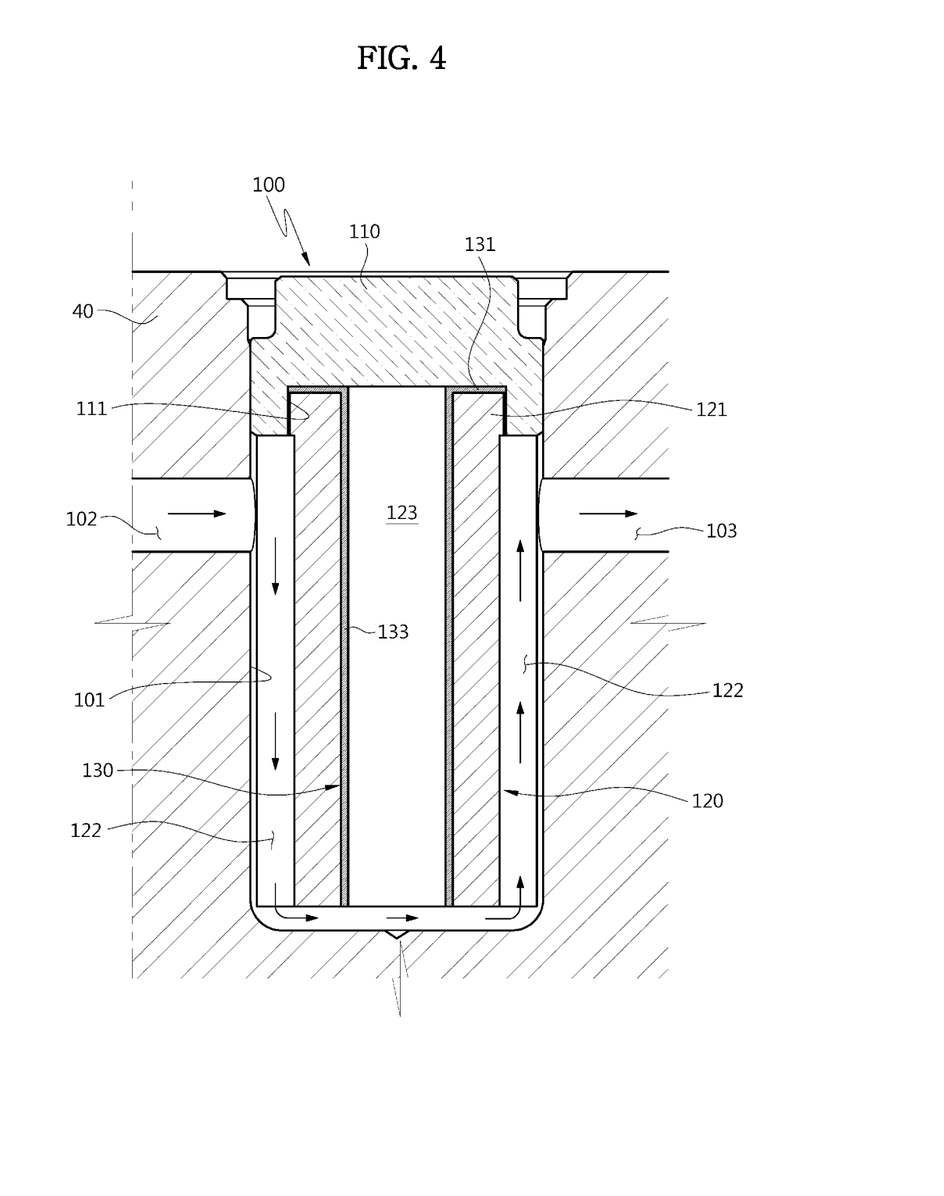
FIG. 4 is a cross-sectional view illustrating a flow of brake oil having a pressure pulsation reduced through a high pressure accumulator provided in a hydraulic system according to an embodiment of the present disclosure.

FIG. 2 is an exploded perspective view illustrating a state in which a high pressure accumulator is assembled to a modulator block in a hydraulic brake system according to an embodiment of the present disclosure, FIG. 3 is an assembled perspective view of FIG. 2, and FIG. 4 is a cross-sectional view illustrating a flow of brake oil having a pressure pulsation reduced through a high pressure accumulator provided in a hydraulic system according to an embodiment of the present disclosure.

Referring to FIGS. 2 to 4, the high pressure accumulator 100 according an embodiment of the present is provided in a bore 101 that communicates an inlet port 102, through which brake oil discharged from the pump (44 in FIG. 1) is introduced, with an outlet port 103 through which brake oil is discharged. In this case, the high pressure accumulator 100 is provided on the main oil passage (47a of FIG. 1), and the inlet port 102 is connected to a portion of the main oil passage 47a that is connected to the outlet port of the pump 44, and the outlet port 103 is connected to a portion of the main oil passage 47a that is connected to the master cylinder 20. In addition, the inlet port 102 and the outlet port 103 are formed opposite to each other with respect to the bore 101. In detail, the high pressure accumulator 100 is provided with a cap member 110 configured to close one side of the bore 101 that is open and a damping member 120 provided in the bore 101.

The cap member 110 is installed to close one end of the bore 101 that is open, while coupled to the damping member 120. A coupling groove 111 is formed in an inner side of the cap member 110, and coupled with the damping member 120. A structure in which the cap member 110 is coupled to the damping member in a press-fitting manner by the coupling groove 111 will be described later.

The damping member 120 is provided in the form of a cylinder having a center thereof hollowed, and is provided at an outer circumferential surface thereof with a bypass flow passage that connects the inlet port 102 to the outlet port 103. The bypass flow passage is formed by a groove 122 formed in the outer circumferential surface of the damping member 120. Referring to FIGS. 2 to 4, the groove 122 may include a plurality of grooves 122 that are formed on the circumferential surface of the damping member 120 lengthwise along the damping member 120 while spaced apart from each other at equal intervals. The grooves 122 may be provided in various numbers as long as the plurality of grooves 122 are disposed at positions corresponding to the inlet port 102 and the outlet port 103, respectively, when the damping member 120 is installed in the bore 101. In addition, a lower end n of the damping member 120 is spaced apart from the bottom surface of the bore 101 such that brake oil introduced into the bore 101 is discharged through the groove 122. That is, the grooves 122 connected to the inlet port 102 and the outlet port 103, respectively, are connected to a space formed between the damping member 120 and the bottom surface of the bore 101 to form a bypass flow passage, thereby guiding a flow of brake oil and reducing a pressure pulsation of brake oil discharged from the pump 44.

The damping member 120 is coupled to the press-fitted to the cap member 110 as described and installed in the bore 101. As a coupling structure for the cap member 110 and the damping member 120, the damping member 120 is provided with a protrusion part 121 that is combined with a coupling groove 111 formed at an inner side of the cap member 110 in a press fitting manner. Although not shown, as an alternate to the coupling structure for the damping member 120 and the cap member 110, a protrusion part may be formed at a lower end of the cap member 110, and a coupling groove may be formed at a position of the damping member 120 corresponding to the protrusion part.

The damping member 120 may be formed of rubber that is elastically deformable to perform shock absorption when high pressure brake oil is introduced. Accordingly, in order to improve the durability of the damping member 120, a reinforcing member 130 is further installed at the damping member 120.

The reinforcing member 130 is provided with an insertion part 133 inserted into a hollow part 123 of the damping member 120 and a support part 131 bentedly extending from the insertion part 133 in a radially outer direction. The insertion part 133 has a through hole that is elongated to have a damping space for reducing a pressure pulsation. The insertion part 133 has the same diameter as an inner diameter of the hollow part 123, to be coupled while coming into close contact with the damping member 120. In addition, the support part 131 makes contact with an end of the damping member 120, that is, with an upper surface of the damping member 120, to prevent the reinforcing member 130 from being separated from the damping member 120. The damping member 120 is provided at an upper side thereof with the protrusion part 121 that is coupled to the cap member 110. The support part 131 is provided to make contact with an upper surface of the protrusion part 121, and is coupled to the cap member 110 together with the protrusion part 121. The reinforcing member 130 is formed in an integral unit including steel having a predetermined stiffness.

Figure 5:
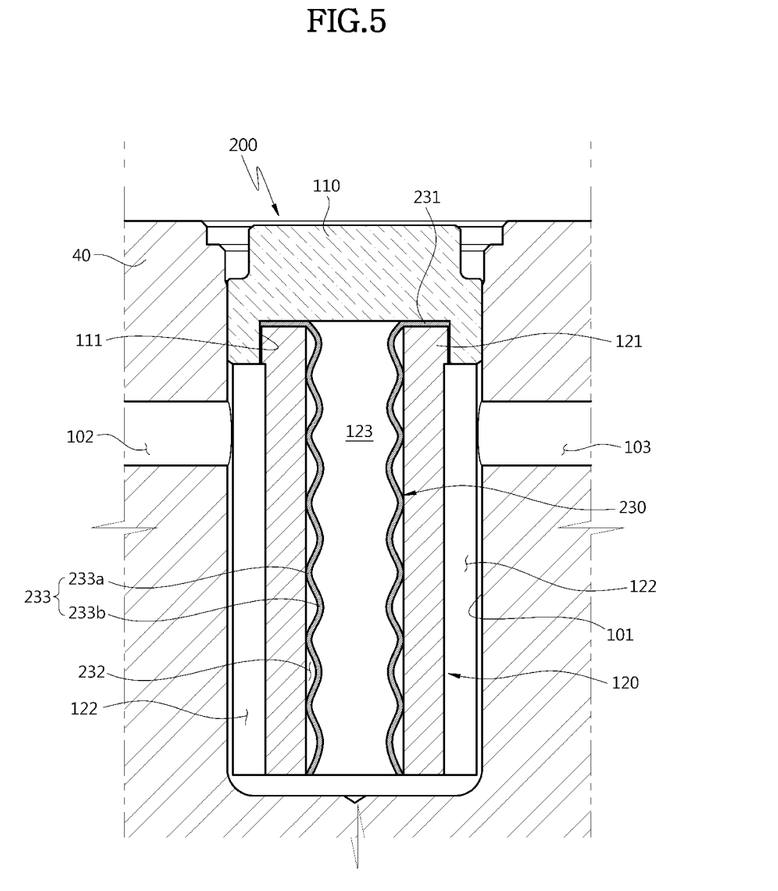
FIG. 5 is a cross-sectional view illustrating a flow of brake oil having a pressure pulsation reduced through a high pressure accumulator provided in a hydraulic system according to another embodiment of the present disclosure.

The high pressure accumulator according to an embodiment of the present disclosure is provided with an additional damping space as shown in FIG. 5. FIG. 5 is a cross-sectional view illustrating a flow of brake oil having a pressure pulsation reduced through a high pressure accumulator provided in a hydraulic system according to another embodiment of the present disclosure. The same reference numerals are used to refer to the same elements in the embodiments of the present disclosure.

Referring to FIG. 5, the high pressure accumulator 200 according to the embodiment of the present disclosure includes the cap member 110 configured to close one side of the bore 101 that is open, the damping member 120 provided in the bore 101, and a reinforcing member 230 installed at the damping member 120.

The reinforcing member 230 is provided with an insertion part 233 inserted into a hollow part 123 of the damping member 120 and a support part 231 bentedly extending from the insertion part 233 in a radially outer direction. The insertion part 233 includes a convex 233a and a concave 233b that are repeatedly formed in a lengthwise direction of the insertion part 233.

As the insertion part 233 of the reinforcing member 230 is inserted into the hollow part 123 of the damping member 120, an inner circumferential surface of the damping member 120 comes into close contact with the convex 233a of the insertion part 233 to form a subsidiary damping space 232 between the damping member 120 and the convex 233a, so that a pressure pulsation of oil introduced from the inlet port 102 at a high pressure is reduced through the subsidiary damping space 232. That is, the efficiency of reducing a pressure pulsation through the high pressure accumulator 100 described in the previous embodiment is further enhanced through the subsidiary damping space 232.

Hereinafter, the reduction of a pressure pulsation by the high pressure accumulators 100 and 200 is described with reference to FIG. 4.

Brake oil discharged at a high pressure by a pumping operation of the pump (44 of FIG. 1) is transmitted to the high pressure accumulator 100 through the inlet port 102. The brake oil introduced through the inlet port 102 is reduced while moving along the groove 122 formed in the damping member 120, that is, moving along a bypass flow passage, and is discharged to the outlet port 103. In this case, a pressure pulsation of the liquid pressure of the brake oil is reduced by the bypass flow passage, and also by the damping member 120 formed of rubber and absorbing shock. In addition, the high pressure accumulator according to the embodiment of the present disclosure is provided with the damping space in the damping member 120 (in detail, a space of the hollow part of the damping member), so that the effect of reducing a pressure pulsation is maximized.

As is apparent from the above, the hydraulic brake system according to the embodiment of the present disclosure can facilitate a process of forming a flow passages in the modulator block by collinearly disposing the inlet port and the outlet port that are connected to the high pressure accumulator, and can effectively reduce a pressure pulsation by forming a bypass flow passage in the high pressure accumulator.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A hydraulic brake system provided with a high pressure accumulator that reduces a pressure pulsation of brake oil being discharged through operation of a pump, wherein the high pressure accumulator comprises:
a damping member that is provided in a bore communicating with an inlet port and an outlet port of the high pressure accumulator, respectively allowing brake oil to be introduced and discharged therethrough, and is provided with a bypass flow passage fluidly connecting the inlet port to the outlet port independently of brake oil pressure at the inlet port; and
a reinforcing member installed at the damping member to improve durability of the damping member,
wherein the bypass flow passage is formed by at least one groove that is formed in an outer circumferential surface of the damping member to communicate the inlet port with the outlet port, and
wherein at least a portion of the reinforcing member is disposed in a through hole of the damping member.

2. The hydraulic brake system of claim 1, wherein the at least one groove is a plurality of grooves formed in a lengthwise direction of the damping member while spaced apart from each other.

3. The hydraulic brake system of claim 1, wherein the damping member has a lower end spaced apart from a bottom surface of the bore.

4. The hydraulic brake system of claim 1, wherein the reinforcing member comprises:
an insertion part that is inserted into a hollow part formed at the center of the damping member; and
a support part that is bentedly extending from one end of the insertion part and makes contact with one end of the damping member so as to be prevented from being separated from the damping member.

5. The hydraulic brake system of claim 4, wherein the insertion part comprises a convex portion and a concave portion that are repeatedly formed in a lengthwise direction of the insertion part, so that a subsidiary damping space is formed between the damping member and the concave portion.

6. The hydraulic brake system of claim 1, further comprising a cap member coupled to the damping member in a press fitting manner to close the bore.

7. The hydraulic brake system of claim 6, wherein a coupling groove is formed in an inner surface of the cap member, and the damping member has a protrusion part combined with the coupling groove.

8. The hydraulic brake system of claim 1, wherein the damping member includes rubber so as to be elastically deformable.

9. The hydraulic brake system of claim 1, wherein the inlet port and the outlet port are disposed opposite to each other with respect to the bore.

10. The hydraulic brake system of claim 1, wherein the reinforcing member comprises an insertion part that is inserted into a hollow part formed at the center of the damping member, wherein the hollow part includes the through hole extending through the damping member in a lengthwise direction such that an outer circumferential surface of the insertion part is surrounded by an inner circumferential surface of the damping member.

11. The hydraulic brake system of claim 10, wherein the through hole extends from a first end of the damping member to a second end of the damping member in the lengthwise direction.

* * * * *